United States Patent
Wigbers et al.

(10) Patent No.: US 8,921,600 B2
(45) Date of Patent: Dec. 30, 2014

(54) PROCESS FOR PRODUCING CARBON FILLERS HAVING COVALENTLY BONDED AMINO GROUPS

(75) Inventors: Christof Wilhelm Wigbers, Mannheim (DE); Marion Kristina Brinks, Mannheim (DE); Johann-Peter Melder, Böhl-Iggelheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/474,261

(22) Filed: May 17, 2012

(65) Prior Publication Data

US 2012/0296121 A1    Nov. 22, 2012

Related U.S. Application Data

(60) Provisional application No. 61/487,306, filed on May 18, 2011.

(51) Int. Cl.
| | | |
|---|---|---|
| *C07C 209/00* | (2006.01) | |
| *C09C 1/56* | (2006.01) | |
| *B82Y 40/00* | (2011.01) | |
| *C01B 31/02* | (2006.01) | |
| *C01B 31/04* | (2006.01) | |
| *C09C 1/54* | (2006.01) | |

(52) U.S. Cl.
CPC . *C09C 1/56* (2013.01); *B82Y 40/00* (2013.01); *C01B 31/0273* (2013.01); *C01B 31/0484* (2013.01); *C09C 1/54* (2013.01); *C01P 2004/13* (2013.01); *C01P 2004/64* (2013.01); *C01P 2006/10* (2013.01); *C01P 2006/12* (2013.01)
USPC ........................................ 564/409

(58) Field of Classification Search
None
See application file for complete search history.

(56) References Cited

U.S. PATENT DOCUMENTS 7,794,683 B1    9/2010 Forohar et al.

FOREIGN PATENT DOCUMENTS

| CN | 101774573 A | 7/2010 |
| WO | WO-2005090233 A2 | 9/2005 |
| WO | WO-2007/051071 A2 | 5/2007 |

OTHER PUBLICATIONS

Billups et al. Chem. Mater 2008, 20, 7339-7343.*
CN101774573 Machine Translation, pp. 1-6, 2013.*
International Search Report for PCT/EP2012/059113, mailed Oct. 12, 2012.
Karousis et al., "Current Progress on the Chemical Modification of Carbon Nanotubes", *Chem. Rev.*, vol. 110, (2010), p. 5366-5397.
Syrgiannis et al., "Covalent Sidewall Functionalization of SWNTs by Nucleophilic Addition of Lithium Amides", *Eur. J. Org. Chem.*, (2008), p. 2544-2550.
Tasis et al., "Soluble Carbon Nanotubes", *Chem. Eur. J.*, vol. 9, (2003), p. 4000-4008.

* cited by examiner

*Primary Examiner* — Clinton Brooks
(74) *Attorney, Agent, or Firm* — Drinker Biddle & Reath LLP

(57) ABSTRACT

The invention relates to a process for producing carbon fillers having covalently bonded amino groups, by converting a mixture comprising carbon fillers and alkali metals and/or alkaline earth metals and/or amides thereof in liquid anhydrous ammonia, optionally together with an inert solvent, at temperatures of 35 to 500° C. and a pressure of 30 to 250 bar.

18 Claims, No Drawings

PROCESS FOR PRODUCING CARBON FILLERS HAVING COVALENTLY BONDED AMINO GROUPS

CROSS-REFERENCE TO RELATED APPLICATIONS

This application claims the benefit of U.S. Provisional Application 61/487,306, filed May 18, 2011, which is incorporated by reference.

BACKGROUND OF THE INVENTION

The invention relates to a process for producing carbon fillers having covalently bonded amino groups.

Carbon fillers have been used as a filler for some time, especially in polymer molding compositions. Examples of such carbon fillers are (conductive) black, graphite, carbon nanotubes or graphenes. It is also possible to use activated carbon or carbon fibers. Use is not restricted to customary filler applications, and it is also possible to conceive of applications, for example in the electronics and storage media sector, such as electrical conductors and transistors, electrode materials, storage media, etc.

According to the prior art, carbon nanotubes (CNTs) are understood to mean principally cylindrical carbon tubes with a diameter of about 3 to 100 nm and a length of several times the diameter. These tubes consist of one or more layers of ordered carbon atoms and have a core of different morphology. They are also referred to, for example, as "carbon fibrils" or "hollow carbon fibers" and are available in different forms (for example bamboo or onion type).

Typical structures of these carbon nanotubes are those of the cylinder type. The cylindrical structures are distinguished between the single-wall monocarbon nanotubes (SWCNTs)), double-wail carbon nanotubes (DWCNTs) and multiwall cylindrical carbon nanotubes (MWCNTs)). Common processes for production thereof are, for example, arc discharge processes, laser ablation, chemical deposition from the vapor phase (CVD process) and catalytic chemical deposition from the vapor phase (CCVD process).

Carbon nanotubes are light, have high tensile strength and conduct electrical current. They have been used to date particularly as additives for polymers.

The advantageous properties of the CNTs are, however, impaired by a series of disadvantages. CNTs have a significant tendency to agglomerate and have poor solubility in polar or nonpolar solvents. One means of remedying this disadvantage consists in the application of functional groups, for example amino groups, to the outer surface of the CNTs.

There is already extensive literature regarding functionalization of CNTs. The production of CNTs comprising amino groups is also already known (e.g. N. Karousis, N. Tagmatarchis, D. Tasis, Chem. Rev. 2010, 110, pages 5366 to 5397). Usually, however, the CNT has to be pretreated before the application of amino groups.

The pretreatment may be a chemical conversion which leads to a functional group, for example a carboxyl group. Only in one or more further chemical steps is this functional group converted to an amino group.

However, the pretreatment may also involve a physical measure, for example a temperature, plasma or ultrasound treatment, or a mechanical treatment by grinding the carbon compound.

Combinations of chemical and physical pretreatment are likewise possible.

The aforementioned reference gives a good overview of the different kinds of functionalization of carbon nanotubes. The introduction of amino groups is shown in FIG. 2, for example. This proceeds from acid chloride groups and involves reaction with sodium azide. Alternatively, the production may proceed via the acid amides. Direct amidation of acyl chlorides is also possible, CN-A-101774573 describes a process for aminating carbon nanotubes, in which carbon nanotubes are first pretreated by means of heat, acids and/or ultrasound treatment, and then reacted with ammonia or ethylenediamine at a temperature of 340 to 350° C. and a pressure of 6 to 11 MPa. The pretreatment makes the process very costly and inconvenient.

U.S. Pat. No. 7,794,683 likewise describes the production of aminated carbon nanotubes, wherein carboxylic acid groups are first introduced by acid treatment with sulfuric acid and nitric acid and are then converted to acyl azides by reaction with diphenylphosphoryl azide. The further reaction leads via isocyanate groups through hydrolysis to form amino-functionalized carbon nanotubes. A disadvantage of the process is the large number of reaction steps, some of which also require expensive reagents.

Eur. J. Org. Chem. 2008, pages 2544 to 2550, describes the covalent side wall functionalization of single-wall carbon nanotubes by nucleophilic addition of lithium amides in THF. Lithium amide is prepared from n-butyllithium and propylamine in dry THF. The reaction is effected at room temperature. After the reaction, oxygen is passed through the reaction mixture, which affords carbon nanotubes substituted by groups of the —NH—$CH_2$—$CH_2$—$CH_3$— structure.

WO 2005/090233 describes the reductive functionalization of carbon nanotubes. For this purpose, carbon nanotubes are introduced into liquid ammonia, into which lithium is additionally introduced as a metal. This is followed by the addition of alkyl halide or aryl halide, which results in alkylation of the external surfaces of the carbon nanotubes; see FIG. 1 and example 1. The reaction is performed while cooling with the aid of acetone/dry ice, with heating to room temperature at the end of the reaction. Aminated carbon nanotubes are not described.

The invention of the processes described above requires the chemical and/or physical pretreatment of the carbon nanotubes before any functionalization. A disadvantage of such a pretreatment is that the structure of the carbon compounds can be damaged by the pretreatment. For example, ultrasound treatment of the carbon nanotubes can result in damage, as described in WO 2005/090233 in paragraph [0009]. In the case of oxidative pretreatment, the surface of the carbon nanotubes is attacked by the oxidizing agents, which leads to defect sites on the surface.

DETAILED DESCRIPTION OF THE INVENTION

It is an object of the present invention to provide a process for producing carbon fillers, such as carbon nanotubes, having covalently bonded amino groups, in which a pretreatment of the carbon fillers can be dispensed with, damage to the carbon fillers such as carbon nanotubes is avoided, and the functionalization can be effected in one reaction step with inexpensive reagents. The functionalization should preferably impair the electrical conductivity of carbon nanotubes only to a minor degree, if at all.

The object is achieved in accordance with the invention by a process for producing carbon fillers having covalently bonded amino groups, by converting a mixture comprising carbon fillers and alkali metals and/or alkaline earth metals and/or amides thereof in liquid anhydrous ammonia, optionally together with an inert solvent, at temperatures of 35 to 500° C. and a pressure of 30 to 250 bar.

It has been found in accordance with the invention that carbon fillers can be functionalized with covalently bonded amino groups by reaction with liquid ammonia comprising alkali metals and/or alkaline earth metals or amides thereof.

WO 2005/090233 disclosed merely an alkylation by reaction with alkyl halides in the presence of lithium in liquid ammonia. Eur. J. Org. Chem. 2008, pages 2544 to 2550, describes the functionalization of carbon nanotubes with lithium n-propylamide, wherein propylamino groups are attached to the carbon nanotubes. The conversion was additionally performed in tetrahydrofuran at room temperature.

In the present application, the term "carbon filler" refers to a particulate solid carbon material formed very predominantly or completely from carbon as the sole element. Examples of such materials are carbon nanotubes, graphenes, carbon black, graphite, activated carbon or carbon fibers. These may be surface-modified, as a result of which further chemical elements are introduced. Nevertheless, the character thereof derives to a crucial degree from an exclusively carbon-based structure. The term "carbon filler" thus, in accordance with the invention, does not imply any specific application, but merely the structure and state of matter of the particulate carbon material. For these particulate carbon materials, not only filler applications but also applications in the electronics and storage media sector, such as electrical conductors and transistors, electrode materials, storage media, etc., are conceivable and additionally included. For example, modified conductive black serves for electrically conductive modification of thermoplastic molding compositions.

According to the invention, the use of the functionalized carbon fillers is thus not restricted to fillers. All advantageous applications are additionally included. Alternatively, the term "particulate carbon material" can be used for the term "carbon filler".

In the process according to the invention, pretreatment of the carbon fillers used is unnecessary. Therefore, the carbon fillers, in one embodiment of the invention, are not pretreated. More particularly, there is no pretreatment with acids, heat, plasma and/or ultrasound, as is the case in the prior art.

Moreover, the reaction is preferably performed in the absence of halogen compounds, especially organic halides such as alkyl or aryl halides.

After the reaction, ammonia is preferably removed from the mixture, then excess alkali metals and/or alkaline earth metals or amides thereof are reacted with alcohols and/or water, and the carbon fillers having covalently bonded amino groups are removed from the reaction mixture.

The excess alkali metals and/or alkaline earth metals or amides thereof are preferably reacted with $C_{1-4}$-alkanols.

The carbon fillers used in the process are preferably selected from single- or multiwall carbon nanotubes, graphenes, carbon black, graphite, activated carbon, carbon fibers and mixtures thereof.

The carbon fillers used in the process in accordance with the invention may be selected from any suitable carbon fillers. The fillers comprise essentially only carbon as a chemical element, disregarding possible impurities.

The carbon fillers especially have a graphitic surface structure.

Examples of single- or multiwall carbon nanotubes are single-wall, double-wall or multiwall carbon nanotubes (SWCNTs, DWCNTs, MWNTs), for example as described above.

Suitable carbon nanotubes and graphenes are known to those skilled in the art. For a description of suitable carbon nanotubes (CNTs), reference may be made to DE-A-102 43 592, especially paragraphs [0025] to [0027], and also to WO 2008/012233, especially at page 16 lines 11 to 41, or to DE-A-102 59 498, paragraphs [0131] to [0135]. In addition, suitable carbon nanotubes are described in WO 2006/026691, paragraphs [0069] to [0074]. Suitable carbon nanotubes are additionally described in WO 2009/000408, page 2 line 28 to page 3 line 11.

In the context of the present invention, carbon nanotubes are understood to mean carbon-containing macromolecules in which the carbon has (principally) graphite structure and the individual graphite layers are arranged in the form of tubes. Nanotubes and the synthesis thereof are already known in the literature (for example J. Hu at al., Acc. Chem. Res. 32 (1999), 435-445). In the context of the present invention, it is possible in principle to use any kind of nanotubes.

The diameter of the individual tubular graphite layers (graphite tubes) is preferably 0.3 to 100 nm, especially 0.3 to 30 nm. Nanotubes can in principle be divided into single-wall nanotubes (SWCNTs) and multiwall nanotubes (MWCNTs). In MWCNTs, there are thus several concentric graphite tubes.

In addition, the outer shape of the tubes may vary; it may have diameters of the same shape on the inside and outside, but it is also possible to produce nodular tubes and vermicular structures.

The aspect ratio (length of the particular graphite tube to diameter thereof) is at least >10, preferably >5. The nanotubes have a length of at least 10 nm. In the context of the present invention, preferred components B) are MWCNTs. More particularly, the MWCNTs have an aspect ratio of approx. 500:1 and an average length in the range from 1 to 500 µm.

The specific BET surface area is generally 50 to 2000 $m^2$/g, preferably from 130 to 1200 $m^2$/g. The impurities which arise in the catalytic preparation (e.g. metal oxides) are generally, according to HRTEM, from 0.1 to 12%, preferably from 0.2 to 10%.

Suitable nanotubes can be purchased under the "multiwall" name from Hyperion Catalysis Int., Cambridge Mass. (USA) (see also EP 205 556, EP 969 128, EP 270 666, U.S. Pat. No. 6,844,061), and also from Bayer Material Science, Nanocyl, Arkema and FutureCarbon.

In the inventive production, no pretreatment or surface modification of the carbon nanotubes is necessary.

Suitable graphenes are described, for example, in Macromolecules 2010, 43, pages 6515 to 6530.

An alternative is to use (conductive) black, graphite or mixtures thereof. Suitable carbon blacks and graphites are known to those skilled in the art.

The carbon black is especially a conductive black or conductivity black, e.g. acetylene carbon. The conductive black used may be any common kind of carbon black, a suitable example being the Ketjenblack 300 commercial product from Akzo.

For conductivity modification, it is also possible to use conductive black. As a result of graphite-like layers embedded into amorphous carbon, carbon black conducts electrons (F. Camona, Ann. Chim. Fr. 13, 395 (1988)). Current is conducted within the aggregates composed of carbon black particles, and between the aggregates if the distances between the aggregates are small enough. In order to achieve conductivity at minimum dosage, preference is given to using carbon blacks with anisotropic structure (G. Wehner, Advances in Plastics Technology, APT 2005, Paper 11, Katowice 2005). In the case of such carbon blacks, the primary particles coalesce to form anisotropic structures, such that the separations of the carbon black particles needed to achieve conductivity are achieved in compounds even at comparatively low loading (C. Van Bellingen, N. Probst, E. Grivei, Advances in Plastics Technology, APT 2005, Paper 13, Katowice 2005).

Suitable carbon black types have, for example, an oil absorption (measured to ASTM D 2414-01) of at least 60 ml/100 g, preferably more than 90 ml/100 g. The BET surface area of suitable products is more than 50 and preferably more than 60 m²g (measured to ASTM D 3037-89). Various functional groups may be present on the carbon black surface. The conductive blacks can be produced by various methods (G. Wehner, Advances in Plastics Technology, APT 2005, Paper 11, Katowice 2005).

In addition, graphite can also be used as a filler. Graphite is understood to mean a polymorph of carbon as described, for example, in A. F. Hollemann, E. Wiberg, "Lehrbuch der anorganischen Chemie" [Inorganic Chemistry], 91st-100th edition, pph. 701-702. Graphite consists of planar carbon layers arranged one on top of another.

Graphite can be comminuted by grinding. The particle size is in the range from 0.01 µm to 1 mm, preferably in the range of 1 to 250 µm.

Carbon black and graphite are described, for example, in Donnet, J. B. et al., Carbon Black Science and Technology, Second Edition, Marcel Dekker, Inc., New York 1993. It is also possible to use conductive black based on highly ordered carbon black. The latter is described, for example, in DE-A-102 43 592, especially [0028] to [0030], in EP-A-2 049 597, especially page 17 lines 1 to 23, in DE-A-102 59 498, especially in paragraphs [0136] to [0140], and in EP-A-1 999 201, especially page 3 lines 10 to 17.

Particle size depends on the particular carbon material and is preferably in the range from 1 nm to 1 mm, more preferably from 2 nm to 250 µm. Carbon fibers preferably have a diameter in the range from 1 to 20 µm, more preferably from 5 to 10 µm. The fibers may also be in the form of fiber bundles.

The reaction is performed in the presence of alkali metals and/or alkaline earth metals or the amides thereof. Alkaline earth metals are preferably Ca or Mg. Alkali metals are preferably selected from Li, Na, K and mixtures thereof. Particular preference is given to using Li or Na, especially Na.

Instead of the alkali metals and alkaline earth metals, it is also possible to use the corresponding amides, which are prepared in an independent reaction step. Suitable among these are lithium amide, sodium amide, potassium amide, calcium amide and magnesium amide, preference being given to lithium amide, sodium amide and calcium amide, particular preference to lithium amide and sodium amide, and very particular preference to sodium amide.

The alkali metal and alkaline earth metal amides can be prepared by converting the metals in liquid ammonia, optionally in the presence of catalysts. Sodium amide is synthesized industrially by passing gaseous ammonia over molten sodium (Ullmanns Encyclopedia of Technical Chemistry, 5th edition, A 2, pages 151 to 161).

Ammonia is used in the form of anhydrous liquid ammonia. "Anhydrous" is understood to mean a water content of less than 1000 ppm.

The conversion can be performed in liquid anhydrous ammonia. Alternatively, it is additionally possible to use a solvent or diluent which is inert under the reaction conditions.

Useful solvents inert under the reaction conditions include ethers such as tetrahydrofuran, dioxane, methyl tert-butyl ether, and aliphatic, cycloaliphatic, aromatic hydrocarbons such as hexanes, cyclohexane and toluene, dimethylformamide or mixtures of these solvents.

The amount of the solvents mentioned is 0 to 20 000% by weight, especially 0 to 2000% by weight, based on the carbon compound used.

The carbon fillers can be introduced into the reactor suspended in the solvents mentioned. After the amination, they can be obtained suspended or dissolved in the solvents after removal of ammonia. As a result of the use of solvents, dusts occur only to a very minor degree. This enables safe operation.

The weight ratio of carbon fillers to ammonia is preferably 1:200, more preferably 1:20 to 1:90.

The molar ratio of alkali metal and alkaline earth metal or alkali metal amide and alkaline earth metal amide to ammonia is preferably 1:1000, more preferably 1:50 to 1:400.

The carbon compounds are aminated at temperatures of 35 to 500° C., preferably 50 to 250° C., more preferably 80 to 180° C.

The total pressures employed are those under which the ammonia is present in liquid form. The pressures are 30 to 250 MPa (bar), especially 70 to 150 MPa (bar).

The conversion can be performed in any suitable reactor which withstands the pressure specified and the temperatures specified. In the course of conversion, preference is given to mixing or stirring the reaction mixture in the reactor.

The reaction mixture is preferably stirred vigorously in a reactor under the reaction conditions specified. The stirrer speeds are 50 to 1000 rpm, especially 250 to 350 rpm. Before use, the reactor is preferably purged with an inert gas, preferably nitrogen or argon.

The inventive conversion is performed preferably for 2 to 24 hours, more preferably 4 to 8 hours, preferably batchwise or else continuously.

For workup, the reaction mixture is preferably decompressed and cooled to 20 to 40° C. In the course of decompression, the ammonia can be vaporized and recovered by cooling. It is also possible to remove the ammonia in a distillation column.

Unconverted alkali metals or alkaline earth metals or corresponding amides present in the reaction output are preferably converted to compounds which can be removed in a nonhazardous manner. Examples of suitable compounds for this conversion are alcohols or water, preferably linear or branched alkyl alcohols having one to four carbon atoms, more preferably methanol or ethanol, most preferably methanol. The alkoxides formed as reaction products can be removed from the aminated carbon compounds together with the corresponding excess alcohols and any solvents. This is preferably effected by removal of the carbon compounds by suction on a suction filter, for example a glass suction filter. The pore size of the suction filter is preferably 10 to 16 µm. The carbon fillers can be washed with an alcohol until the filtrate is no longer alkaline.

If a dry carbon compound is required, it can be dried to constant weight, for example at 50 to 100° C. under reduced pressure.

The invention is illustrated in detail by the examples which follow.

EXAMPLES

The aminated carbon fillers obtained were, after production, analyzed by means of XPS analysis to determine the nitrogen content.

The method description for XPS for the study of CNT functionalization levels is described hereinafter:

The functionalization is determined by means of XPS on a standard laboratory spectrometer with monochromatic aluminium K alpha radiation (e.g. Phi 5600 LS, Phi VersaProbe or Kratos Axis Nova) using a typical charge neutralization method. The elemental composition is quantified by means of an overview spectrum (1350 eV to −5 eV, step width 0.5 eV, pass energy 112-160 eV). For the quantification, the relative sensitivity factors (RSFs) determined for the particular instrument are used, and a Shirley background subtraction is conducted.

The functionalization is determined from detailed spectra (measurement range ±5-10 eV from the peak maximum, energy resolution 0.1 eV, pass energy 20-30 eV) by comparing the peak maxima of the carbon and of the heteroatoms with known comparative data (e.g. Beamson G., Briggs D. High Resolution XPS of Organic Polymers: the Scienta ESCA300 Database (1992)).

For the quantification, the carbon line shape of the reactant is determined under the same measurement conditions on the same spectrometer as for the product (detail spectrum, Shirley background subtraction).

The peak maximum of carbon is corrected to 284.5 eV (aromatic carbon) and the change in the functionalization is determined via a fit of the line shape of the reactant and of various reference peaks to the measured spectrum of the product.

Example 1

Amination of MWCNTs in the presence of sodium in liquid ammonia

The conversion was performed in a stirred autoclave (reaction volume 3.5 l with disk stirrer). The autoclave was purged with argon. 30 g of Baytubes® C 150 P MWCNTs (moistened with 140 ml of tetrahydrofuran) and 8 g of sodium were introduced, After closing the autoclave, 1200 ml (720 g) of ammonia were metered in in liquid form. At a stirrer speed of 300 rpm, the autoclave was heated to 120° C. A pressure of 84 bar was established. After 3 hours, the autoclave was cooled to 40° C., 0.5 l of methanol was pumped in in order to convert any residual sodium and sodium amide. The autoclave was decompressed gradually and kept at 40° C. for outgassing for one hour. After again pumping in 0.5 l of methanol, the autoclave was emptied through a riser line.

The reaction output was filtered through a glass suction filter (10-16 μm) and washed with one liter of methanol. After transferring the CNTs to a 1 l Erlenmeyer flask, they were stirred with one liter of methanol for 15 minutes and filtered off with suction again. This operation was repeated three times. Subsequently, the CNTs were dried to constant weight at 70° C. under reduced pressure.

The detailed spectra of the nitrogen from the XPS analysis show amine at 400.6 eV. The nitrogen content was determined to be 0.6 at % (mean from 3 measurement points).

Example 2

Amination of graphene in the presence of sodium in liquid ammonia

Analogously to example 1, 100 mg of graphene (Vor-X) were suspended in 10 ml of tetrahydrofuran and stirred in a 300 ml autoclave in the presence of 120 ml (72 g) of ammonia and 800 mg of sodium at 120° C. and 300 rpm for 5 hours. A total pressure of 100 bar was established.

The aminated graphene was cooled to 40° C. The aminated graphene was washed out of the autoclave with methanol and filtered off with suction using a 0.5 μm Teflon membrane.

Then the graphene was suspended in 100 ml of methanol, stirred for 30 minutes and filtered off with suction again. This operation was repeated once more, before the graphene was dried to constant weight at 70° C. under reduced pressure.

The detailed spectra of nitrogen from the XPS analysis show amine at 400.7 eV and imine at 398.9 eV. The amine nitrogen content was determined to be 0.6 at % and the imine nitrogen content to be 0.9 at % (each mean from 5 measurement points).

The injection of nitrogen is not absolutely necessary.

Example 3

Amination of MWCNTs in the presence of sodium amide in liquid ammonia

Analogously to example 2, 500 mg of Baytubes®C 150 P MWCNTs were converted in the presence of 10 ml of tetrahydrofuran, 250 mg of sodium amide and 120 ml of liquid ammonia. After the workup and drying described in example 2, the XPS analysis was performed.

The detailed spectra of nitrogen from the XPS analysis show amine at 400.4 eV and imine at 398.9 eV. The amine nitrogen content was determined to be 1.1 at % and the imine nitrogen content to be 0.9 at % (each mean from 5 measurement points).

Example 4

Analogously to example 1, 10 g of Nanocyl 7000 MWCNTs were converted in the presence of 140 ml of tetrahydrofuran, 5 g of sodium and 1200 ml (720 g) of ammonia. The workup and drying were effected as described in example 1.

The detailed spectra of the nitrogen from the XPS analysis show amine at 400.7 eV. The nitrogen content was determined to be 1.1 at % (mean from 3 measurements).

Example 5

Analogously to example 1, 30 g of Arkema C100 MWCNTs were converted in the presence of 140 ml of tetrahydrofuran, 15 g of sodium and 1200 ml (720 g) of ammonia. The workup and drying were effected as described in example 1.

The detailed spectra of the nitrogen from the XPS analysis show amine at 400.5 eV. The nitrogen content was determined to be 1.0 at % (mean from 5 measurements).

Example 6

Analogously to example 2, 500 mg of acetylene carbon (ABCR-50% compressed, average particle size: 0.042 μm, density: 0.100 g/cm$^3$, surface area: 80 m$^2$/g) were converted in the presence of 10 ml of tetrahydrofuran, 500 mg of sodium and 120 ml (72 g) of liquid ammonia and after injection of 30 bar of nitrogen. The workup and drying were effected as described in example 2.

The detailed spectra of nitrogen from the XPS analysis show amine at 399.7 eV. The nitrogen content was determined to be 1.1 at % (mean from 5 measurement points).

Example 7

Analogously to example 2, 500 mg of SWCNTs, for example obtainable from Nanocyl, were converted in the presence of 10 ml of tetrahydrofuran, 500 mg of sodium and 120 ml (72 g) of liquid ammonia and after injection of 30 bar of nitrogen. The workup and drying were effected as described in example 2.

The detailed spectra of nitrogen from the XPS analysis show amine at 399.7 eV. The nitrogen content was determined to be 0.9 at % (mean from 5 measurement points).

The invention claimed is:

1. A process for producing carbon fillers having covalently bonded amino groups, comprising converting a mixture comprising carbon fillers and alkali metals and/or alkaline earth metals thereof in liquid anhydrous ammonia, optionally together with an inert solvent, at temperatures of 35 to 500° C. and a pressure of 30 to 250 bar, wherein the conversion is effected in one step, wherein the conversion is followed by removal of ammonia from the mixture, reaction of excess alkali metals and/or alkaline earth metals or amides thereof with alcohols and/or water and removal of the carbon fillers having covalently bonded amino groups from the reaction mixture, and wherein the excess alkali metals and/or alkaline earth metals or amides thereof are reacted with $C_{1-4}$-alkanols.

2. The process according to claim 1, wherein the carbon fillers are selected from single- or multiwall carbon nanotubes, graphenes, carbon black, graphite, activated carbon, carbon fibers and mixtures thereof.

3. The process according to claim 1, wherein the reaction is performed in the presence of an alkali metal selected from Li, Na, K and mixtures thereof.

4. The process according to claim 1, wherein the conversion is performed at a temperature of 50 to 250° C.

5. The process according to claim 1, wherein the conversion is performed at a pressure of 70 to 150 bar.

6. The process according to claim 1, wherein the conversion is performed in the absence of halogen compounds.

7. The process according to claim 1, wherein the carbon fillers used have not been pretreated.

8. The process according to claim 7, wherein the carbon fillers used have not been pretreated with acids, heat, plasma and/or ultrasound.

9. The process according to claim 1, wherein the conversion is performed in the absence of alkyl or aryl halides.

10. A process for producing carbon-fillers having covalently bonded amino groups, comprising converting a mixture comprising carbon fillers and alkali metals and/or alkaline earth metals thereof in liquid anhydrous ammonia, optionally together with an inert solvent, at temperatures of 35 to 500° C. and a pressure of 30 to 250 bar, wherein the conversion is effected in one step and is performed in the absence of an organic halide, and wherein the excess alkali metals and/or alkaline earth metals or amides thereof are reacted with $C_{1-4}$-alkanols.

11. The process according to claim 10, wherein the carbon fillers are selected from single- or multiwall carbon nanotubes, graphenes, carbon black, graphite, activated carbon, carbon fibers and mixtures thereof.

12. The process according to claim 10, wherein the reaction is performed in the presence of an alkali metal selected from Li, Na, K and mixtures thereof.

13. The process according to claim 10, wherein the conversion is performed at a temperature of 50 to 250° C.

14. The process according to claim 10, wherein the conversion is performed at a pressure of 70 to 150 bar.

15. The process according to claim 10, wherein the conversion is performed in the absence of halogen compounds.

16. The process according to claim 10, wherein the carbon fillers used have not been pretreated.

17. The process according to claim 16, wherein the carbon fillers used have not been pretreated with acids, heat, plasma and/or ultrasound.

18. The process according to claim 10, wherein the conversion is performed in the absence of alkyl or aryl halides.

* * * * *